J. Annis,
Cage Trap.

No. 44,763. Patented Oct. 18, 1864.

Witnesses:
Inventor:

UNITED STATES PATENT OFFICE.

JOHN ANNIS, OF GALVA, ILLINOIS, ASSIGNOR TO HIMSELF AND HORTON KELSEY, OF SAME PLACE.

IMPROVEMENT IN ANIMAL-TRAPS.

Specification forming part of Letters Patent No. 44,763, dated October 18, 1864.

*To all whom it may concern:*

Be it known that I, JOHN ANNIS, of Galva, in the county of Henry and State of Illinois, have invented a new and Improved Trap for Catching Rats, Mice, and other Small Animals; and I do hereby declare that the following is a full, clear, and exact description thereof, which will enable any person skilled in the art to make and use the same, reference being had to the accompanying drawings, forming a part of this specification, in which—

Figure 1:
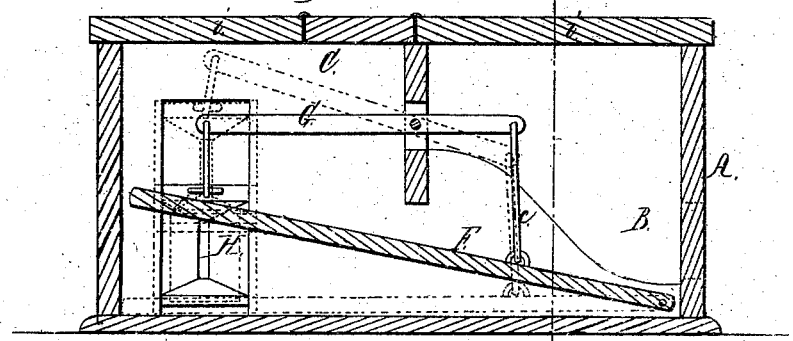
Figure 2:
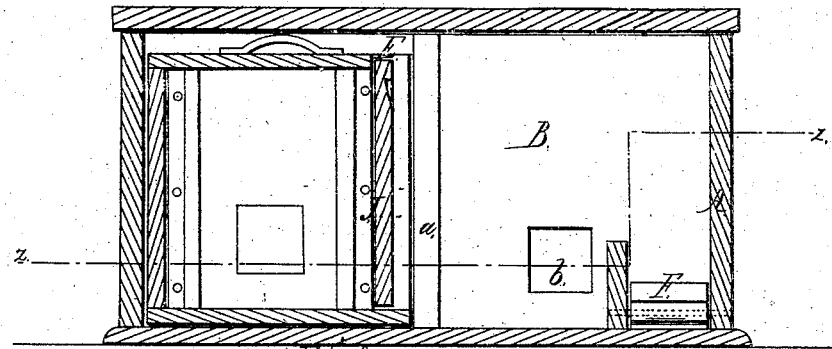
Figure 3:
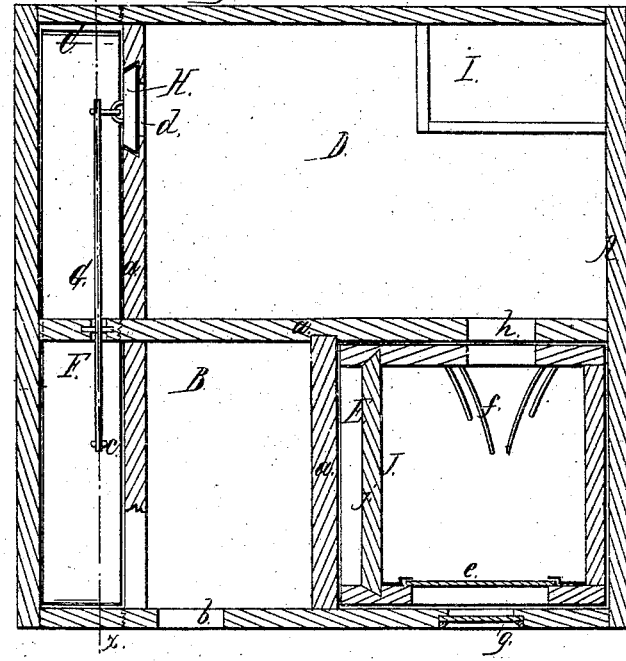

Figure 1 is a vertical section of my invention, taken in the line $x\ x$, Fig. 3; Fig. 2, a vertical section of the same, taken in the line $y\ y$, Fig. 1; Fig. 3, a horizontal section of the same, taken in the line $z\ z$, Fig. 2.

Similar letters of reference indicate the same parts.

This invention consists in a box of rectangular or other form divided into compartments, and provided with a sliding door, treadle, side lights, and a removable box having a conical entrance, all arranged as herein described, whereby a very simple and efficient trap is obtained.

A represents a rectangular box, which is divided into four compartments, B C D E, by partitions $a$. (See Fig. 3.)

The compartment C is provided with an opening, $b$, through which the animals enter. F is a treadle which passes through an opening in the partition between the two compartments B C, and is connected to a lever, G, by a rod, $c$, the front end of said lever being connected to a sliding door, H, which works over an opening, $d$, that forms a communication between the compartments C and D. The gravity of the door H is sufficient to keep the treadle F elevated.

The compartment D is provided with a box, I, in which the bait is placed; and the compartment E is provided with a box, J, which is removable, and has a glass, $e$, in one side of it, and a conical wire entrance, $f$, in the opposite side. The glass $e$ is in line with a glass, $g$, in the side of the compartment E, and the conical wire entrance $f$ is in line with an opening, $h$, which forms a communication between the compartments D and E.

The box A is provided with lids $i\ i$, by raising which all of the compartments are accessible. The box I is provided at one side with a sliding door, $j$.

The operation is as follows: The animal enters the compartment B through the opening $b$, and passes upon the treadle F, and depresses it, thereby raising the door H, so as to open the communication between C and D, the animal entering the latter, the door H dropping by its own gravity as soon as the animal enters D. The light seen at the opening $h$, and which passes through the glasses, $e\ g$, attracts the animal, and it passes through the wire entrance $f$ into the box J, and cannot return. This box J may be removed from time to time as it becomes filled.

This trap is self-setting, and an animal cannot escape from it after being caught.

Having thus described my invention, what I claim as new, and desire to secure by Letters Patent, is—

A trap for catching rats and other animals, composed of a box, A, divided into a series of compartments, provided respectively with a treadle connected with a sliding door, a bait-box, and an animal-reception box having a conical wire entrance, and provided with a glass to admit the light, all being arranged to operate in the manner substantially as and for the purpose herein specified.

JOHN ANNIS.

Witnesses:
S. M. GORDON,
A. H. YOUNG.